(12) United States Patent
Bansal

(10) Patent No.: US 11,023,900 B2
(45) Date of Patent: Jun. 1, 2021

(54) ROUTING CUSTOMER FEEDBACK AND SERVICE REQUEST

(71) Applicant: Dell Products L.P., Round Rock, TX (US)

(72) Inventor: Ankit Bansal, Bangalore (IN)

(73) Assignee: Dell Products L.P., Round Rock, TX (US)

(*) Notice: Subject to any disclaimer, the term of this patent is extended or adjusted under 35 U.S.C. 154(b) by 188 days.

(21) Appl. No.: 16/124,433

(22) Filed: Sep. 7, 2018

(65) Prior Publication Data

US 2020/0082412 A1 Mar. 12, 2020

(51) Int. Cl.
*G06Q 30/00* (2012.01)
*G06Q 10/06* (2012.01)

(52) U.S. Cl.
CPC ... *G06Q 30/016* (2013.01); *G06Q 10/063112* (2013.01)

(58) Field of Classification Search
CPC .............. G06Q 30/016; G06Q 10/063112
See application file for complete search history.

(56) References Cited

U.S. PATENT DOCUMENTS

| | | | |
|---|---|---|---|
| 7,877,265 B2 | 1/2011 | Pasquale et al. | |
| 7,886,227 B2* | 2/2011 | Aggarwal | G06F 9/453 715/705 |
| 8,380,820 B1* | 2/2013 | Kumarjiguda | H04L 67/2809 709/219 |
| 2003/0187672 A1* | 10/2003 | Gibson | G06Q 30/02 709/206 |
| 2004/0002993 A1 | 1/2004 | Toussaint et al. | |
| 2015/0249742 A1* | 9/2015 | Li | H04W 68/04 455/414.1 |
| 2016/0350294 A1* | 12/2016 | Nefedov | G06F 16/248 |
| 2017/0061409 A1* | 3/2017 | Morecki | G06Q 30/02 |
| 2017/0149969 A1* | 5/2017 | Mockus | H04M 3/5108 |
| 2018/0278750 A1* | 9/2018 | Avila | H04M 3/5233 |
| 2018/0285768 A1* | 10/2018 | Karuppasamy | G06Q 30/016 |
| 2019/0108486 A1* | 4/2019 | Jain | G06F 11/3668 |
| 2019/0147455 A1* | 5/2019 | Wang | G06N 5/022 707/723 |
| 2019/0220695 A1* | 7/2019 | Nefedov | G06F 16/38 |
| 2019/0244196 A1* | 8/2019 | John | G06Q 20/24 |

OTHER PUBLICATIONS

Searching service repositories by combining semantic and ontological matching T Syeda-Mahmood, G Shah, R Akkiraju . . . - . . . Conference on Web . . . , 2005—ieeexplore.ieee.org (Year: 2005).*

(Continued)

*Primary Examiner* — Jonathan G Sterrett
(74) *Attorney, Agent, or Firm* — Terrile, Cannatti & Chambers; Emmanuel A. Rivera

(57) ABSTRACT

A system, method, and computer-readable medium for performing receiving customer product specific issues and routing to appropriate business entities that include receiving customer product specific issues from various channels; tokenizing the customer product specific issues into tokens; routing the tokens to the appropriate business entities; and matching customer service requests with relevant tokens.

20 Claims, 7 Drawing Sheets

(56) References Cited

OTHER PUBLICATIONS

Textual data mining of service center call records PN Tan, H Blau, S Harp, R Goldman—Proceedings of the sixth ACM . . . , 2000—dl.acm.org (Year: 2000).*
https://en.wikipedia.org/wiki/JSON retrieved from the web on Dec. 1, 2020 (Year: 2020).*
clientheartbeat.com, How it Works, printed Jul. 12, 2018.
kampyle.com, Voice of Customer Done Right, printed Jul. 12, 2018.
usersnap.com, Smart Feedback to Build Great Digital Products, printed Jul. 12, 2018.

* cited by examiner

| FTR-Id | Feedback Token Repository | Best match Category |
|---|---|---|
| FTR - 1 | os/wifi/application/networking/USB/Serial input and output/charger/screen/... | Client machines |
| FTR - 2 | PowerEdge620/SATA/SSD/NIC/PSU/Fan/CPU/PCI | Compute server |
| FTR - 3 | Partitioning/RAID/VD/backup/Spanlenght/Depth/... | RAID FW team |
| FTR - 4 | XPS/E5700/Alienware/Latitute | Laptop |
| FTR - 5 | MD3400/VD/Flash/PD | Storage |
| FTR - 6 | Sled/ServerSlot/Chassis/M1000e/Sojo/... | Modular |
| FTR - 7 | FN410S/Man/C9010/N3048 | Network team |
| FTR - 8 | Price/margin/... | Sales |
| FTR - 9 | Delivery address/ not deliverd /... | Shipping |
| FTR - 10 | Damaged/ part missing | Services |

*Figure 3*

| FID | Feedback/Service request |
|---|---|
| FID-1 | Laptop Wifi connectivity is keep getting dropped |
| FID-2 | I am looking for extended warranty for XPS 13, please share the price |
| FID-3 | What is the discount I will get in case planning to by E5470 in 100+ pieces |
| FID-4 | Server is not getting idetified in my monitoring console when I inserved in 2nd ServerSlot |
| FID-5 | Dell EMC network switch FN410S vlan port not getting created |
| | extract RAID-Controller Logs using MegaCLI for Windows and |
| FID-6 | Linux |
| FID-7 | Latest FW for MD3400 isnatllation taking time |
| FID-8 | Rebuilding of virtual disk completes with errors |

*Figure 4*

ROUTING CUSTOMER FEEDBACK AND SERVICE REQUEST

BACKGROUND OF THE INVENTION

Field of the Invention

The present invention relates to product support systems. More specifically, embodiments of the invention relate to providing customer feedback through different channels regarding products, such as goods and services.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Products, such as goods and services, are provided by businesses to customers. Customer issues arise related to the products. Appropriate teams and entities of a business should be made aware of such customer issues. The customer issues should be resolved. Customers should be updated and assured that resolution has taken place regarding the customer issues. An option available to businesses is the use of customer feedback systems. A customer feedback system generally processes, compiles, stores, and/or communicates customer issues. Certain customer feedback systems are website based. A customer logs on a business' website and enters feedback regarding a product or products. Some customer feedback systems implement customer surveys with limited and specific questions. Customer issues can include different issues and provided through various channels. Customer feedback systems can be limited in the ability to address particular and varying customer issues, and limited in accessing the channels used by customers in providing customer issues/feedback. Customer feedback systems may include a variety of hardware and software components that may be configured to process, store, and communicate information and may include one or more computer systems, data storage systems, and networking systems.

SUMMARY OF THE INVENTION

A system, method, and computer-readable medium are disclosed for performing receiving customer product specific issues and routing to appropriate business entities that include receiving customer product specific issues from various channels; tokenizing the customer product specific issues into tokens; routing the tokens to the appropriate business entities; and matching customer service requests with relevant tokens.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 3 shows a tokenized customer product specific issue or token table.

FIG. 4 shows a service request table.

DETAILED DESCRIPTION

Figure 1:
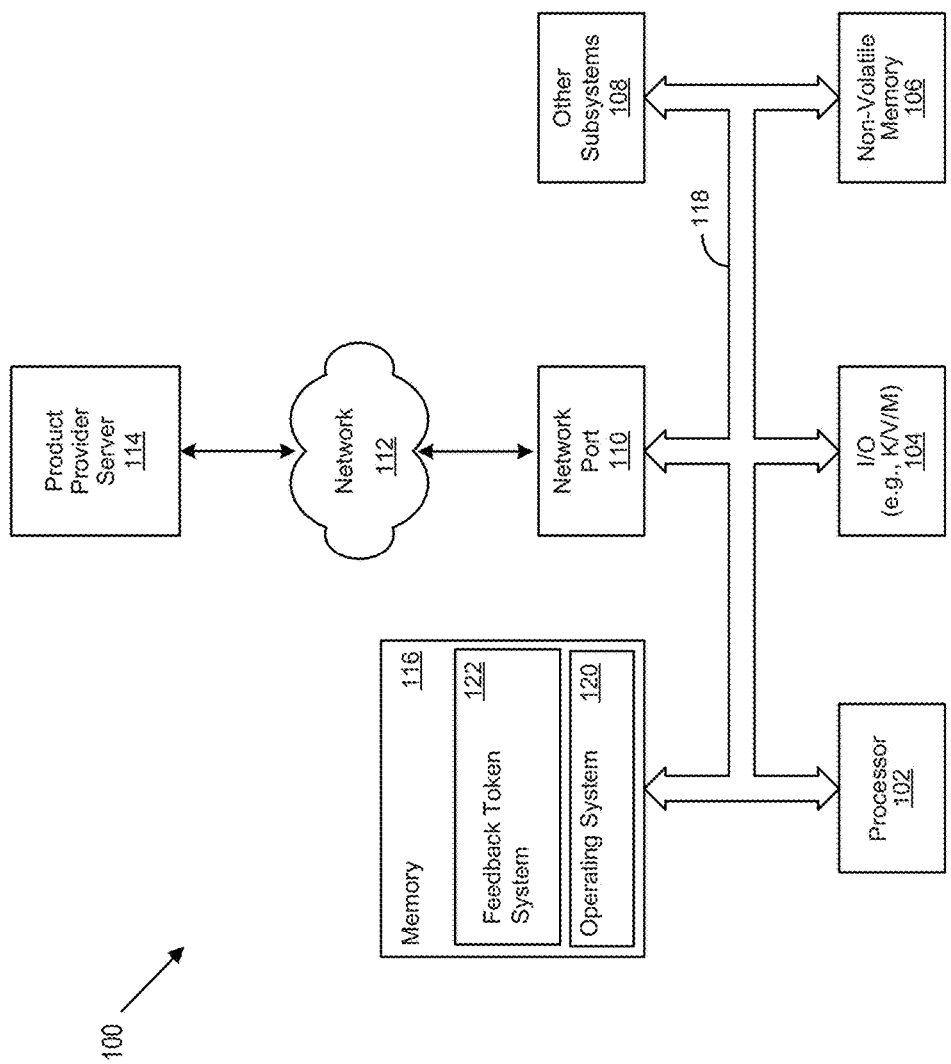
FIG. 1 shows a general illustration of components of customer feedback system as implemented in the system and method of the present invention.

A system, method, and computer-readable medium are disclosed for routing customer feedback and service requests using a token or unique identifier based system using various input and output channels. In certain embodiments, issues related to specific products from different customers are received through various channels on different platforms, such as social media, websites (e.g., company/business websites), sales/marketing calls, emails, public forums, etc. The customer product specific issues can include customer feedback and service requests. The customer product specific issues are tokenized or made unique. The tokens, also referred to as "tokens", are sent to the appropriate business teams, product managers, and other business entities. The customer product specific issues are addressed, and resolutions related to the specific products are sent back to customers through the various channels. For certain embodiments, resolutions are in form of new product announcements or product improvements, and service updates.

In certain embodiments, the customer product specific issues are provided with a unique identifier and tokenized or identified as "tokens." Customer product specific issues are consolidated and provided as relevant and manageable data to the appropriate business entities. Business entities can include product managers, business team and engineering teams that able to address and resolve problems related to the product specific issues.

In certain embodiments, service requests are matched with tokenized product specific issues. The matched service requests and "tokens" are sent or routed to the appropriate business entities for resolution. In certain embodiments, a short term resolution is provided in the form of a service or product update and in other instances long term resolution is provided in the form product redesign or replacement.

In certain embodiments, a feedback token operation as part of the customer feedback system uses a feedback tokenize engine or FTE. The FTE receives product specific issues from customers from the various channels. The FTE includes a feedback collector or data collector module that communicates with the different platforms used by the various channels. This communication is used to gather the product specific issues. In certain embodiments, customers will use various devices to provide the product specific issues. The various devices can implement a feedback interactive client (FIC), such as an installed application or website access page, to provide the product specific issues.

In certain embodiments, the FTE can include a data filter and deduplication module used to filter and remove duplicate information based on a particular unique key. The FTE includes a feedback token repository (FTR), which can also be known as product or device repository. The FTR provides a unique identifier (as discussed above) to a particular product specific issue and relates the particular product specific issue with a best match business entity(ies) to address the product specific issue. In certain embodiments, the FTE uses a feedback channel bus (FCB) to communicate to the respective business entity(ies).

For purposes of this disclosure, a customer feedback system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, the customer feedback system may be a personal computer, a network storage device, or any other suitable device and may vary in size, shape, performance, functionality, and price. The customer feedback system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The customer feedback system may also include one or more buses operable to transmit communications between the various hardware components.

FIG. 1 is a generalized illustration of a customer feedback system 100 that can be used to implement the system and method of the present invention. The customer feedback system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the customer feedback system 100 includes network port 110 operable to connect to a network 112, which is likewise accessible by a product provider server 114. The customer feedback system 100 likewise includes system memory 116, which is interconnected to the foregoing via one or more buses 118. System memory 116 further includes an operating system (OS) 120 and a feedback token system 122.

The feedback token system 122 performs a customer feedback operation for product related issues, and receives, process, distribute to various company entities the product related issues. In certain embodiments, the feedback token system 122 communicates with various customer implemented platforms through various channels. The communication can be through particular application program interfaces or APIs.

The feedback token system 122 improves processor efficiency (and thus the efficiency of the customer feedback system 100) facilitating customer feedback. As will be appreciated, once the customer feedback system 100 is configured to perform a feedback token operation, the customer feedback system 100 becomes a specialized computing device specifically configured to perform the feedback token operation and is not a general purpose computing device. Moreover, the implementation of the feedback token operation on the customer feedback system 100 improves the functionality of the customer feedback system 100 and provides useful results of automatically identifying receiving, processing and resolving customer product specific issues.

Figure 2:
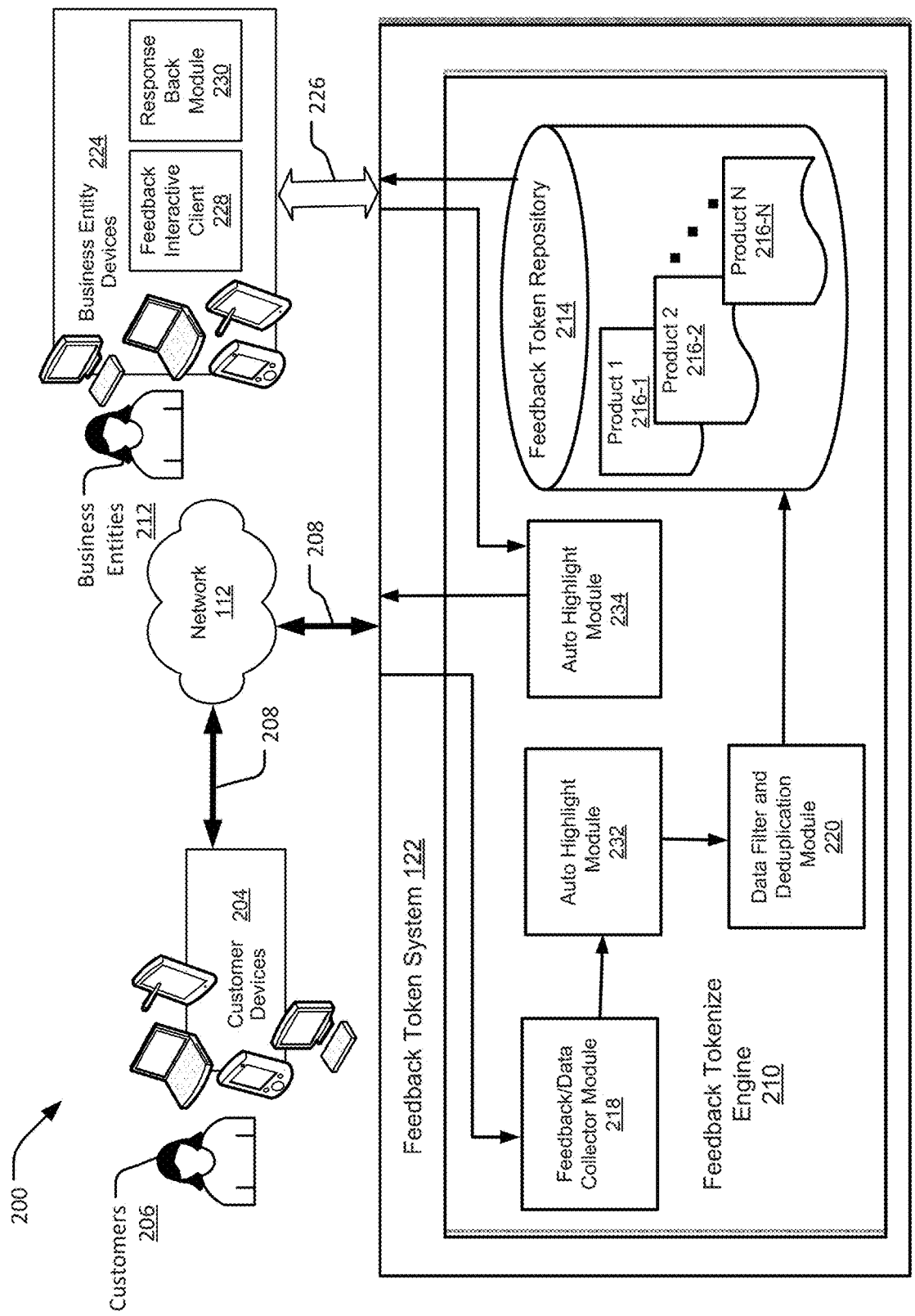
FIG. 2 shows a block diagram a block diagram of a customer feedback environment.

FIG. 2 is a block diagram of a customer feedback environment 200 implemented in accordance with an embodiment of the invention. The customer feedback environment 200 includes the feedback token system 122. The feedback token system 122 interacts with various devices, or customer devices 204. In particular, customers 206 generate issues related to specific products. The product specific issues include customer feedback and service requests. Customers 206 enter the product specific issues into the customer devices 204.

As used herein, a customer device 204 refers to an information handling system such as a personal computer, a laptop computer, a tablet computer, a personal digital assistant (PDA), a smart phone, a mobile telephone, or other device capable of communicating and processing data. Customer devices 204 can further include different platforms and operating systems (OS). For example, customer devices 204 can run on Apple® OS, various Android® OS, Microsoft® OS, Linux® OS, etc. Furthermore, customer devices 204 can include web based and device based platforms. The list are examples, and is not intended to be limiting.

For the purposes of this disclosure a website may be defined as a collection of related web pages which are identified with a common domain name and is published on at least one web server. A website may be accessible via a public internet protocol (IP) network or a private local network. A web page is a document which is accessible via a browser which displays the web page via a display device of an information handling system. In various embodiments, the web page also includes the file which causes the document to be presented via the browser. In various embodiments, the web page may comprise a static web page which is delivered exactly as stored and a dynamic web page which is generated by a web application that is driven by software that enhances the web page via user input to a web server.

Customer devices 204 are used to exchange information between the customers 206 and the feedback token system 122 through the use of network 112. In certain embodiments, the network 112 can be a public network, such as the Internet, a physical private network, a wireless network, a virtual private network (VPN), or any combination thereof. Skilled practitioners of the art will recognize that many such embodiments are possible and the foregoing is not intended to limit the spirit, scope or intent of the invention.

Network 112 can include various communication channels (channels) as represented by 208. Examples of channels 208 include social media (Facebook® media, Twitter® media, hashtags, etc.), company/business site feedback sections, email, blogs/forums, etc. The list includes examples, and is not intended to be limiting.

In an implementation, the feedback token system 122 includes a feedback tokenize engine or FTE 210. The FTE 210 receives and processes customer product specific issues, which can include product feedback and service requests; tokenizes the customer product specific issues and in particular customer feedback. Each customer feedback is made unique or tokenized; however, there can be similar or the same customer feedback. Each customer feedback is given/ assigned a unique identifier and tokenized. The tokenized customer product issues can be referred to as tokens. The FTE 210 routes the tokens to the appropriate business entities 212.

For certain embodiments, the FTE 210 includes a feedback token repository or FTR 214. The FTR 214 stores tokens. In certain implementations, the FTR 214 stores tokens and customer service requests as represented as products 216. In certain implementations, FTR 214 will have pre-loaded tokens at boot start of the feedback token system 122. The use of pre-loaded tokens can be used for different business lines which define or provide criteria for the tokens. This can allow to effectively channel the tokens to the appropriate business lines or business entities 212.

In certain embodiments, the FTE 210 includes a feedback collector or data collector module 218. The feedback collector or data collector module 218 communicates with the various platforms of customer devices 204 to collect customer product specific issues, such as customer feedback and service requests. For example, feedback or data collector module 218 can collect customer product specific issues (e.g., feedback) from social media. In certain implementations, the feedback or data collector module 218 subscribes or communicates to different web services to periodically collect customer feedback and service requests. Customer product specific issues can include data containing customer details, feedback, date, region, country location, product details, etc. Such data may be in the form of various scripts or formats such XML, JSON, etc. The feedback or data collector module 218 is configured to read such scripts or format.

For certain embodiments, the FTE 210 includes a data filter and deduplication module 220. The same customer product specific issues, such as customer feedback and service requests, can originate from different sources, such as different web services, forums, business websites, etc. In order to be more accurate and avoid duplication, such customer product specific issues are filtered to determine if there is duplication. The determination may be based on checking on a unique key such as "originator, date, and product." In other words, if a token includes the same "originator," "date," and "product," there is a duplication, and succeeding tokenized customer product issues are filtered.

In certain embodiments, the feedback token system 122 communicates with business entities 212, and particularly to business entity devices 224. A business entity device 224 refers to an information handling system such as a personal computer, a laptop computer, a tablet computer, a personal digital assistant (PDA), a smart phone, a mobile telephone, or other device capable of communicating and processing data. Business entity devices 204 can further include different platforms and operating systems (OS). For example, business entity devices 204 can run on Apple® OS, various Android® OS, Microsoft® OS, Linux® OS, etc. Furthermore, business entity devices 204 can include web based and device based platforms. The list includes examples, and is not intended to be limiting.

Certain implementations include the use of a feedback channel bus or FCB 226. Business entities 212 such as product managers and product teams can subscribe to made aware of relevant customer product specific issues. For certain implementations, tokens are "pushed" to the particular business entities 212. Since tokens are "pushed" to the business entities 212. New or updated tokens are received by business entities 212.

In certain embodiments, a business entity device 224 includes a feedback interactive client (FIC) 228. For certain embodiments, the FIC 208 can be a lightweight client application installed on a device, such as a mobile device, as an installed application, or provide access to a webpage. The FIC 228 communicates over the FCB 226. Business entities 212 that subscribe to particular topics provided by the FCB 226 through the FIC 228 can monitor relevant customer product specific issues using a business entity device 224. In this regard, the business entities 212 are able to receive summaries and specific information, such as criticality, related to specific products.

In certain embodiments, business entity device 224 includes a response back module 230. Once the customer product specific issues (e.g., service requests) are available on the FIC 228, a business entity can mark and take ownership of the customer product specific issue(s) and take action. In certain implementations, the response back module 230 responds back to the originator or customer that sent the customer product specific issue. The response can be by email, posting to a site, reply back to a social media service, or through any other various channels.

For certain embodiments, the FTE 210 includes an auto highlight module 232 to identify particular keywords, keys, fields, etc. for received customer product specific issues and service requests. The FTE 210 can also include an auto highlight module 234 to identify particular keywords keys, fields, etc. for reporting back to customer devices 204. In certain implementations, the auto highlight module 232 and auto highlight module 234 are used to match tokenized product specific issues with customer service requests.

FIG. 3 is an example diagram of a tokenized customer product specific issue or token table 300 implemented in accordance with an embodiment of the invention. The token table 300 includes a list 302 of tokens. In certain embodiments, the FTE 210 processes the tokens. The tokens are stored in the FTR 214. In certain implementations, the FTR 214 will store predefined tokens. These predefined tokens are preloaded to allow for a boot start of the FTE 210, and for use for particular business lines which initially define such customer feedback and service requests. The use of such preloaded tokens can allow to channel collected customer feedback and service requests to the proper business lines or business entities.

For certain implementations, keywords or properties are used to define tokenized product specific issues. Examples of such properties can include: "Product Series Numbers" (e.g., MD3400, M620, etc.); "Major Component Names" (e.g., physical disk, SATA, etc.); "Internal Technology" (e.g., Server Slot, Depth); "Features" (e.g., WiFi, Screen).

For example, a customer product specific issue, such as a customer feedback can include the keywords "PowerEdge620", "SATA", "SSD", "NIC", "PSU", "Fan", "CPU" and "PCI." These keywords are extracted from the customer product specific issue or customer feedback, and are represented as item 304 in table 300.

In certain implementations, table 300 includes customer product specific issues such as what is represented by item 304. The customer product specific issues are listed under the heading "Feedback Token Repository" 306. Table 300 further includes a unique identifier for each customer product specific issue, as represented by heading "FTR-Id" 308. A determination is made as to the most appropriate business entity for the customer product issue as represented by heading "Best Match Category" 310. Therefore, as an example, customer product specific issue 304 is given a unique identifier of "FTR-2" as represented by 312. The business entity determined to best address the customer product specific issue is "Compute Server" as represented by 314.

In certain instances, during a customer feedback process, the feedback token system 122 does not find a defined/predefined an appropriate token. The FTE 210 can add a new tokenized customer product specific issue in the FTR 214. For example, item 316 represents a new token.

FIG. 4 is an example diagram of a service request table 400 implemented in accordance with an embodiment of the invention. As described above, for certain implementations, the feedback collector or data collector module 218 communicates with the various platforms of customer devices 204 to collect customer product specific issues, such as customer feedback and service requests. For certain implementations, once such service requests are received, they can be processed by the FTE 210. The table 400 represents collected service requests. In this example, table 400 includes a feedback or service request heading represented by 402 and a feedback or service request identifier or "FID" as represented by 404. In this example, table 400 includes a list 406 of service requests with assigned unique identifiers.

Figure 5:
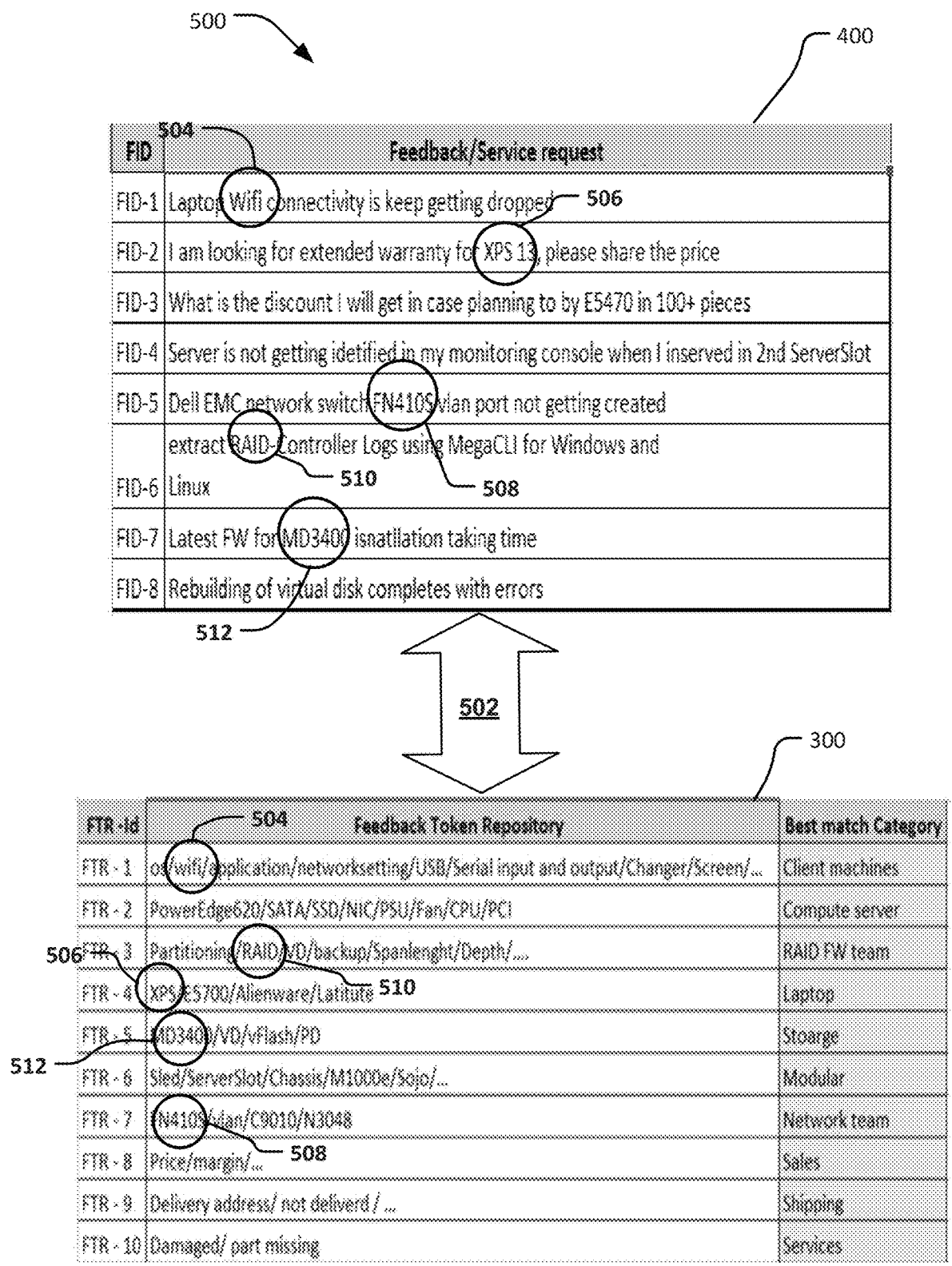
FIG. 5 shows a token matching process.

FIG. 5 is an example diagram of token matching process 500 accordance with an embodiment of the invention. Token matching 500 is a method that in certain implementations is performed by the feedback token system 122 to match customer service requests with pre-defined tokens. Matched service requests and tokens are routed to the appropriate business entities 212.

For certain embodiments, the service request table 400 with a list of service requests is pulled from the FTR 214. The service request table 400 can be continuously updated. A pulled request table 400 can be representative of the most up to date version resident on FTR 214. Furthermore, the token table 300 that includes a list of predefined tokens is pulled from the FTR 214.

A matching algorithm 502 is performed by the feedback token system 122. In particular implementations, the auto highlight module 230 is used to perform the matching algorithm. An example matching algorithm that can be implemented in certain embodiments is as follows:

Matching Algorithm
  a) Non-Alphanumeric from lists [!, @, #, $ %, &]
  b) Analyzer (Feedback/service request, Non-Alphanumeric)
  c) for each 'i' in FID [where 'i' is a counter to iterate each row of FID table 400]—
  d) for each 'j' in FTR [where 'j' is a counter to iterate each row of FTR table 300]—
  e) if TokenMatch (Feedback/service request, Business Entity[i,j])
  f) FTR[j] will be Token value
  g) Business Entity of FTR[j] will be the team where to route particular FID[i]
  h) Return In certain implementations, the matching algorithm identifies entries in the service request table 400 and token table 300 character by character. Once a non-alphanumeric character or space is identified during the scanning process, the entire characters before the space will be extracted or identified as a keyword or term. The token matching algorithm can check if any of the service requests of service request table 400 matches with any tokens in token table 300.

The matching algorithm identifies and matches keywords or terms between entries in the service request table 400 and token table 300. In this example, the matching algorithm identifies the keyword or terms "WiFi" 504, "XPS" 506, "FN10S" 508, "RAID" 510 and "MD340" that are found entries in both service request table 400 and token table 300.

Figure 6:
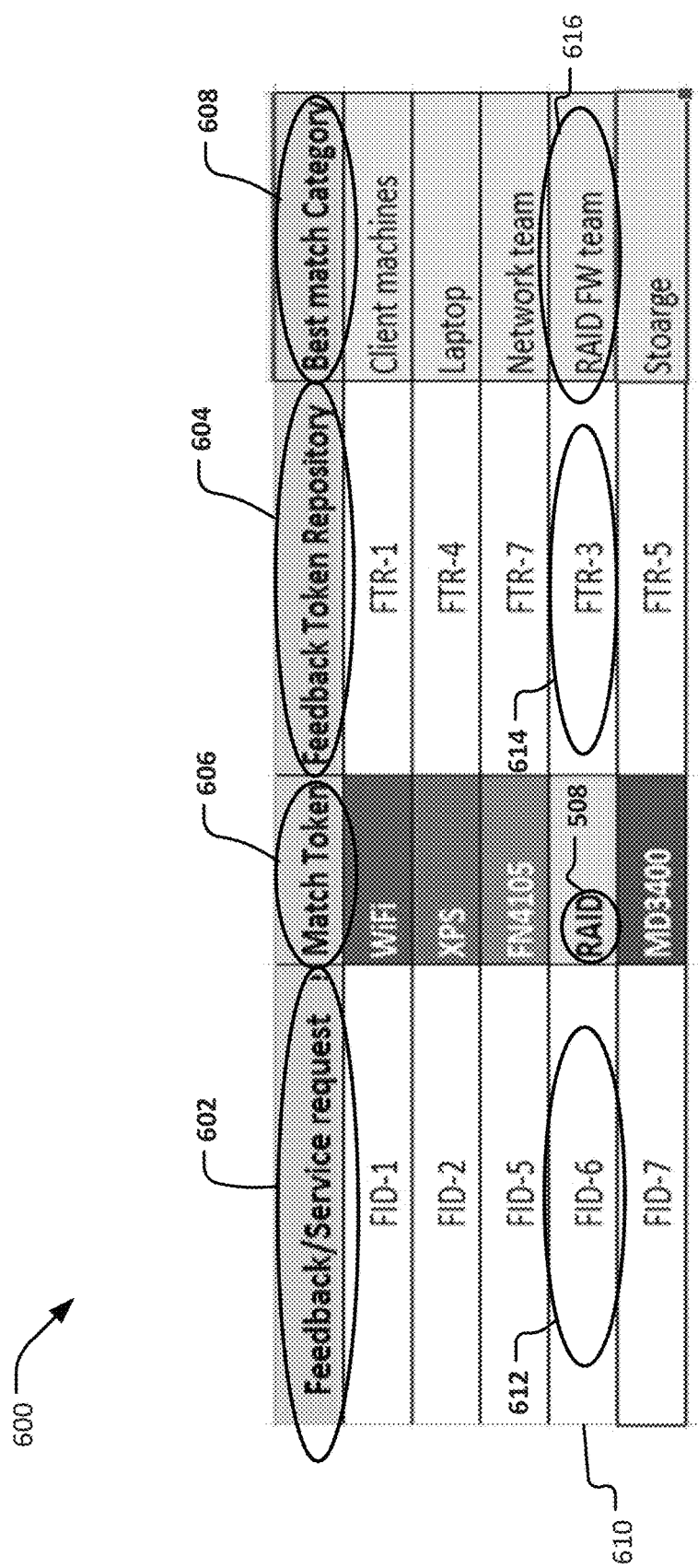
FIG. 6 shows a matching algorithm results table.

FIG. 6 is an example diagram of a matching algorithm results table 600 implemented in accordance with an embodiment of the invention. In certain implementations, the feedback token system 122 will generate the results table 600 after identifying entries that have common keywords or terms in service request table 400 and token table 300.

In this example, results table 600 identifies the matched entries from service request table 400 and token table 300 by particular identifiers. In this example, heading 602 identifies the entries from service request table 400 and heading 604 identifies entries from token table 300. Heading 606 identifies the common keyword or term. The heading 608 identifies the appropriate business entity. The contents of the appropriate business entity are part of the matched entry of the token table 300. Therefore, the business entity that is associated with a token, is now associated with a particular matched service request. The service request can be routed to the appropriate business entity. For example, in entry 610 of table 600, the common keyword or term is "RAID" 510. The matched specific service request is related to identifier "FID-6" 612. The matched specific token is related to identifier "FTR-3" 614. The appropriate business entity to route the service request to is "RAID FW team" 616.

Figure 7:
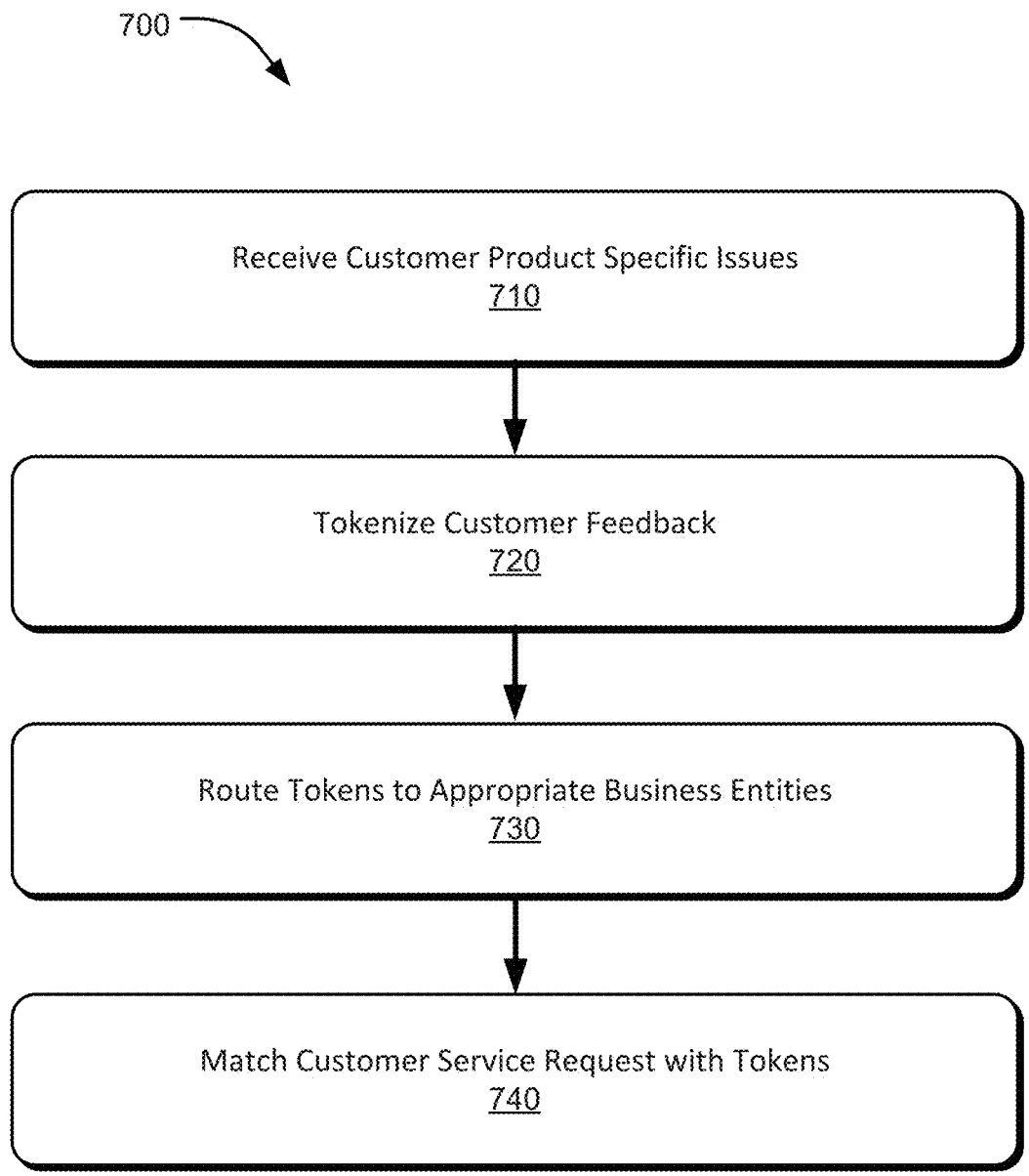
FIG. 7 shows a flow chart of a data processing flow of feedback token operation.

Referring to FIG. 7, a flow chart of a data processing flow 700 of a feedback token operation is shown. The data processing flow starts at step 710 by receiving customer product specific issues. The customer product specific issues can include customer feedback and service requests related to particular products. The customer product specific issues are received from various channels. Next at step 720, customer product specific issues, and in particular customer feedback is tokenized. Tokenized customer feedback can be referred to as tokens. In certain implementations, the tokens are stored in repository. Next at step 730, the tokens are routed to the appropriate business entities. The appropriate businesses entities can monitor and receive updated or new tokens. Next at step 740, customer service requests are received and a matching is performed to match customer service requests with relevant tokens that indicate the appropriate business entities to send the service requests.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a token feedback operation, comprising:
   providing a feedback interactive client (FIC) using an installed application or website access page to receive product specific issues using XML or JSON;
   creating a feedback request identifier (FID) table with a plurality of records (i);
   creating a feedback token repository (FTR) table with a plurality of records (j);
   receiving the customer product specific issues in the form of computer script or format received by a data collector module of a feedback tokenize engine (FTE);
   tokenizing the received customer product specific issues by the FTE into unique identified tokens, wherein predefined tokens are preloaded into the FTE and subsequent customer product support issues are tokenized and added to a feedback token repository (FTR) by the FTE, wherein the FTR pulls lists of service requests having feedback request identifiers (FID);
   matching the unique identified tokens through feedback token system that includes an auto highlight module that implements a matching algorithm that identifies appropriate tokens determined to best resolve the customer product specific issues, wherein the matching algorithm performs the following steps:
   a) iterate through each field (i) of the FID table and each field (j) of the FTR table using a nested loop
   b) compare the unique token to each field of the FID table and the FTR table according to the nested loop
   c) adding a new token to the FTR table by the FTE when the comparison does not result in a match
   d) identify one of more business entities based on the comparison of the unique token to the FID and FTR fields;
   routing through the FTE the appropriate tokens via a feedback channel bus (FCB) to the one or more business entities.

2. The method of claim 1, wherein:
   the data collector module receives the customer product specific issues from various channels and various computing platforms.

3. The method of claim 1, wherein:
   the tokenizing the received customer product specific issues is performed on customer feedback.

4. The method of claim 1, further comprising:
   storing the tokens in a repository prior to routing the tokens to the one or more business entities.

5. The method of claim 4, further comprising:
   storing predefined tokens directed to particular business lines.

6. The method of claim 1, further comprising:
   receiving customer service requests; and
   matching the customer service requests with relevant tokens.

7. The method of claim 1, further comprising:
   filtering duplicate customer product specific issues through a data filter and deduplication module of the FTE prior to tokening the received customer product specific issues.

8. A system comprising:
   a processor;

a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for:

provalidating a feedback interactive client (FIC) using an installed application or website access page to receive product specific issues using XML or JSON;

creating a feedback request identifier (FID) table with a plurality of records (i);

creating a feedback token repository (FTR) table with a plurality of records (j);

receiving the customer product specific issues in the form of computer script or format received by a data collector module of a feedback tokenize engine (FTE);

tokenizing the received customer product specific issues by the FTE into unique identified tokens, wherein predefined tokens are preloaded into the FTE and subsequent customer product support issues are tokenized and added to a feedback token repository (FTR) by the FTE, wherein the FTR pulls lists of service requests having feedback request identifiers (FID);

matching the unique identified tokens through feedback token system that includes an auto highlight module that implements a matching algorithm that identifies appropriate tokens determined to best resolve the customer product specific issues, wherein the matching algorithm performs the following steps:

a) iterate through each field (i) of the FID table and each field (j) of the FTR table using a nested loop b) compare the unique token to each field of the FID table and the FTR table according to the nested loop c) adding a new token to the FTR table by the FTE when the comparison does not result in a match d) identify one of more business entities based on the comparison of the unique token to the FID and FTR fields;

routing through the FTE the appropriate tokens via a feedback channel bus (FCB) to the one or more business entities.

9. The system of claim 8, wherein the data collector module receives the customer feedback and customer service requests from various channels supporting various computing platforms.

10. The system of claim 8, wherein the routing is pushed to the particular business entities over a dedicated feedback channel bus.

11. The system of claim 8, wherein the instructions executable by the processor are further configured for:
storing the tokens and customer service requests in a repository.

12. The system of claim 8, wherein the instructions executable by the processor are further configured for:
matching tokens with the customer service requests.

13. The system of claim 8, wherein the instructions executable by the processor are further configured for:
filtering similar customer feedback and service requests received from various channels through a data filter and deduplication module of the FTE.

14. A non-transitory, computer-readable storage medium embodying computer program code, the computer program code comprising computer executable instructions configured for:

providing a feedback interactive client (FIC) using an installed application or website access page to receive product specific issues using XML or JSON;

creating a feedback request identifier (FID) table with a plurality of records (i);

creating a feedback token repository (FTR) table with a plurality of records (j);

receiving the customer product specific issues in the form of computer script or format received by a data collector module of a feedback tokenize engine (FTE);

tokenizing the received customer product specific issues by the FTE into unique identified tokens, wherein predefined tokens are preloaded into the FTE and subsequent customer product support issues are tokenized and added to a feedback token repository (FTR) by the FTE, wherein the FTR pulls lists of service requests having feedback request identifiers (FID);

matching the unique identified tokens through feedback token system that includes an auto highlight module that implements a matching algorithm that identifies appropriate tokens determined to best resolve the customer product specific issues, wherein the matching algorithm performs the following steps:

a) iterate through each field (i) of the FID table and each field (j) of the FTR table using a nested loop b) compare the unique token to each field of the FID table and the FTR table according to the nested loop c) adding a new token to the FTR table by the FTE when the comparison does not result in a match d) identify one of more business entities based on the comparison of the unique token to the FID and FTR fields;

routing through the FTE the appropriate tokens via a feedback channel bus (FCB) to the one or more business entities.

15. The non-transitory, computer-readable storage medium of claim 14, wherein:
the data collector module receives the customer product specific issues from various channels and various computing platforms.

16. The non-transitory, computer-readable storage medium of claim 14, wherein:
the tokenizing includes assigning identifiers to the customer product specific issues.

17. The non-transitory, computer-readable storage medium of claim 14, wherein the computer executable instructions are further configured for:
filtering duplicate received customer product specific issues.

18. The non-transitory, computer-readable storage medium of claim 14, wherein the computer executable instructions are further configured for:
matching tokens with customer service requests.

19. The non-transitory, computer-readable storage medium of claim 14, wherein:
the routing pushes new or updated tokens to the particular business entities.

20. The non-transitory, computer-readable storage medium of claim 14, wherein the computer executable instructions are further configured for:

receiving confirmation by the FTE from the business entities of ownership of tokens and customer service requests.

\* \* \* \* \*